Sept. 2, 1958     V. C. BOWMAN     2,850,062
POTATO CUTTING MACHINE

Filed April 30, 1956     3 Sheets-Sheet 1

Victor C. Bowman
INVENTOR.

Sept. 2, 1958 V. C. BOWMAN 2,850,062
POTATO CUTTING MACHINE
Filed April 30, 1956 3 Sheets-Sheet 3

Victor C. Bowman
INVENTOR.

BY *Clarence A. O'Brien*
*and Harvey B. Jacobson*
Attorneys

United States Patent Office 2,850,062
Patented Sept. 2, 1958

2,850,062
POTATO CUTTING MACHINE
Victor C. Bowman, Burley, Idaho
Application April 30, 1956, Serial No. 581,744
11 Claims. (Cl. 146—78)

This invention relates to potato cutting machines and particularly to a machine which is intended primarily to cut seed potatoes prior to planting.

An object of the present invention is to provide a power operated machine which more efficiently severs the potatoes, dividing and subdividing them into small pieces, the average piece containing at least one eye, preparatory to potato planting.

A more specific object of the invention is to provide a potato severing machine which has a support on which there is a potato bin arranged with an extractor to withdraw potatoes therefrom and deposit them on a pair of rollers that have deflector plates constituting with the rollers a closed bottom pocket, whereby in proper timed sequence a knife severs the potato while in this pocket and then one of the rollers is displaced in order to permit the severed potato to drop by gravity either on an endless conveyor or on troughs which lead the potato to a second cutting station, the size of the potato accounting largely for the course of the potato that is whether it is to fall onto the endless conveyor or into the trough or troughs for subsequent cutting operations thereon.

A further object of the invention is to provide a machine as described immediately above wherein the second cutting station is formed by a plurality of pockets that have rollers forming the bottoms thereof on which the parts of the potatoes are seated and in a similar, properly timed sequence the potato parts are subdivided and one of the rollers disposed to permit the again severed parts of the potatoes to fall onto the endless conveyor which empties into a basket, bin or other suitable receptacle for further processing and use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 8:
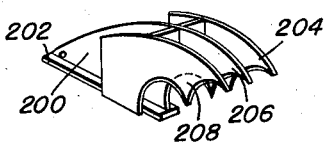

Figure 7 is a schematic diagrammatic view of the drive connections between the various parts of the machine, this view being in perspective; and Figure 8 is a perspective view of one of the cutters that may be used in the lower part of the machine in order to subdivide the potato parts into a plurality of final pieces, this view showing that the knife may contain only one blade, but may contain two, three or more.

The potato cutting machine 10 that is made in accordance with the principles of the invention, consists of a frame 12. This frame is generally rectangular and made of angle iron legs and sides as well as cross members or braces as found necessary and expedient to support the various parts of the machine in their proper relationship to each other. An upper structure 14 on support 12 retains a potato bin 16 in which seed potatoes 18 are placed. Structure 14 also mounts a potato extractor 20 for rotary movement so that the arms 22 and 24 thereof move into the bin 16, impale a potato and swing it around through slot 26 in bin 16 and deposit it in pocket 28. Extractor 20 is constructed and functions the same as the corresponding structure seen at 62 in my copending application Serial No. 457,436 which was filed on November 27, 1955, and now abandoned.

After the potato is withdrawn from bin 16, extractor 20 drops it into pocket 28 that is formed by deflector plates 30 and 32 on opposite sides of the pocket and deflector plates 34 and 36 at the front and rear of the pocket. Deflector plates 30 and 32 are mounted on pivots 40 and 42 respectively, the latter being secured to cross members at the top of support 12. Springs 44 and 46 attached to the deflector plates 30 and 32 and to sides of the support 12 tend to yieldingly pivot the deflectors towards each other at the lower end of pocket 28 in order to center the potato on the rollers 48 and 50 that constitute the bottom of the pocket. Front and rear deflectors 34 and 36 are fastened to the support.

When the potato has been deposited in the pocket 28, the potato is severed into two parts by a knife 52 whose cutting edge 54 is arcuated to fit over both of the rollers 48 and 50 while severing the potato thereon. Slot 58 in deflector plate 36 provides clearance through which the knife oscillates. This knife is mounted for pivotal movement on pin 60 (Figure 1) that is carried on a bracket of support 12. One edge of knife 52 has a flange 61 on it that is contacted by crank arm 62 which is on shaft 64. The latter is mounted in bearings, as at 65 and 66 on support 12 and is arranged with relation to the knife 52 to oscillate the same in response to rotary motion of the shaft 64. A spring 70 attached at one end to bracket 71 and at the other end to the knife 52 is used to return the knife to the position shown in Figure 1 after it has been oscillated by the crank arm 62. Bracket 71 is fixed to and constitutes a part of support 12, being connected to one of the cross members thereof.

Figure 4:
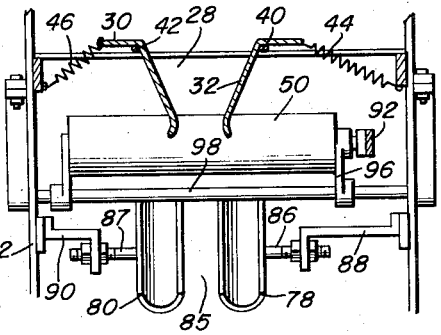
Figure 4 is a sectional view taken on the line 4—4 of Figure 1.
Figure 5:
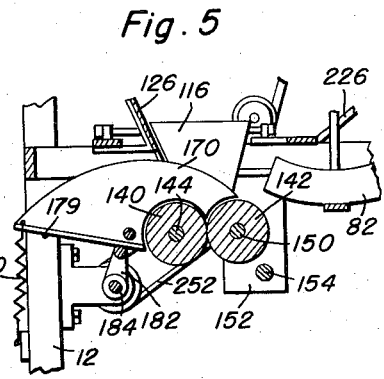
Figure 5 is a fragmentary sectional view of the lower cutting means that are used for severing the parts of the potatoes that have already been initially cut in the machine.
Figure 6:
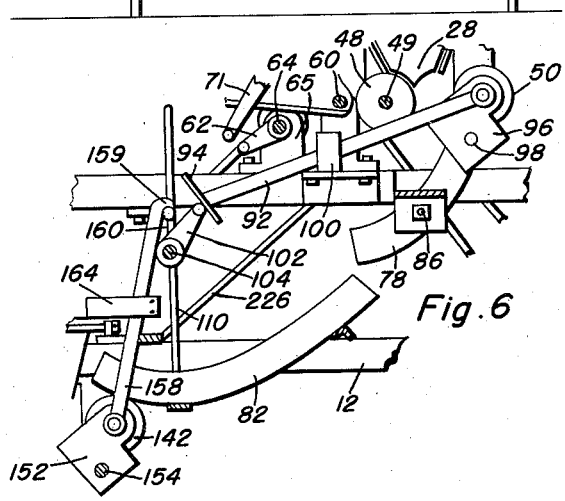
Figure 6 is a fragmentary sectional view of a portion of the machine of Figure 1 repeating the same structure but arranged in a different position, that is the position wherein the pockets for the potatoes are being opened by moving one of the rollers away from the other.

After the potato has been severed by knife 52, roller 50 is displaced with respect to roller 48 thereby opening the bottom of pocket 28 and permitting the two parts of the now severed potato to fall by gravity onto the endless conveyor 74 at the lower part of the machine. This conveyor is made by an endless belt entrained over conveyor rollers 75 and 76 which are mounted in bearings on the support 12. However, those potato parts that are not small enough to fall between the two troughs 78 and 80 (Figure 4) are carried by these arcuate troughs for deposit onto the troughs 82 and 83 that are in registry with the first mentioned troughs 78 and 80. Troughs 78 and 80 are adjustable toward and away from each other in order to vary the space 85 between them. This adjustment may be achieved by having bolts 86 and 87 secured to the troughs 78 and 80, these bolts being held in adjusted positions on mounting brackets 88 and 90 that are carried by the support 14.

Figure 1:
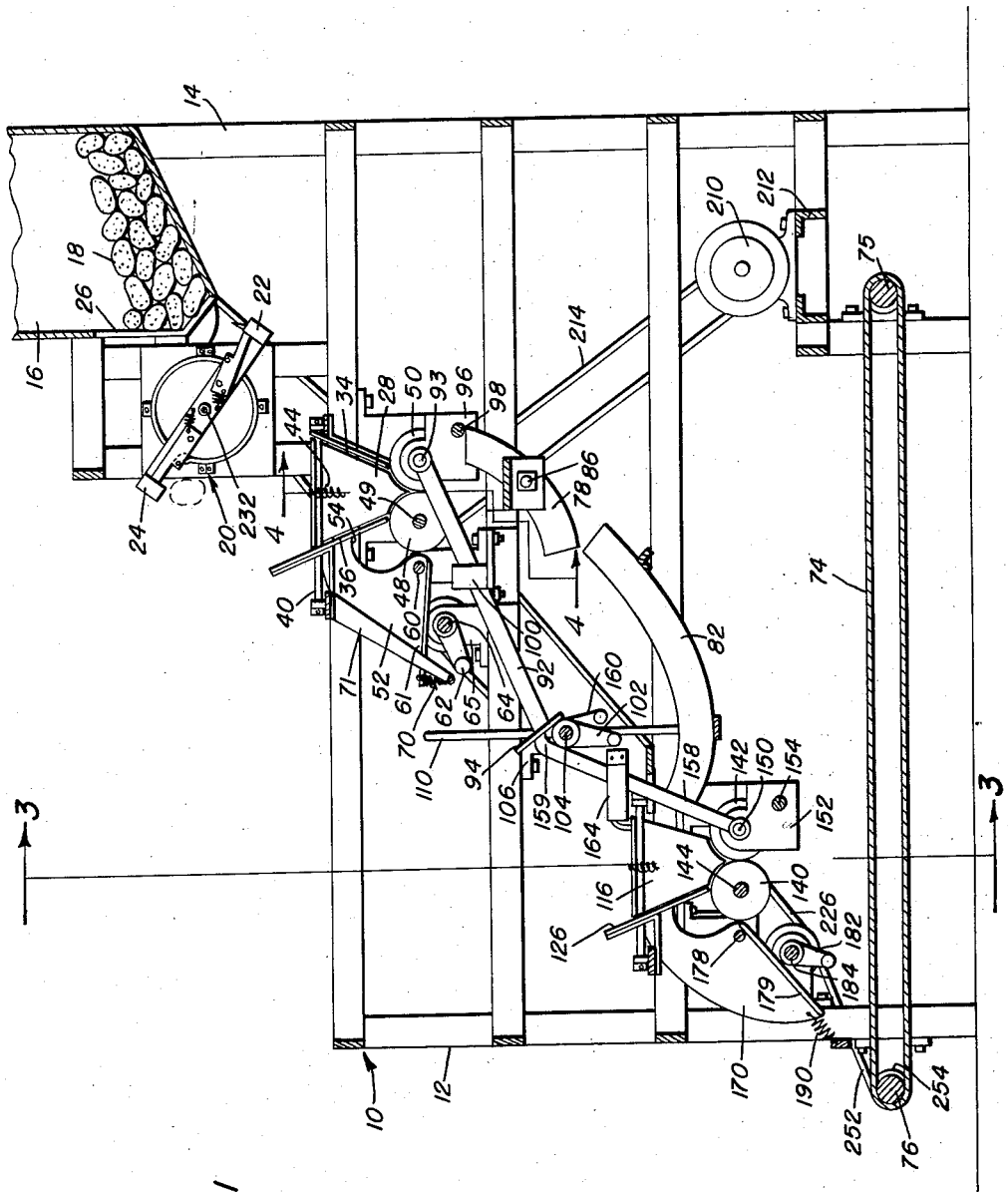
Figure 1 is a longitudinal sectional view of a machine which is constructed in accordance with the principles of the invention.
Figure 2:
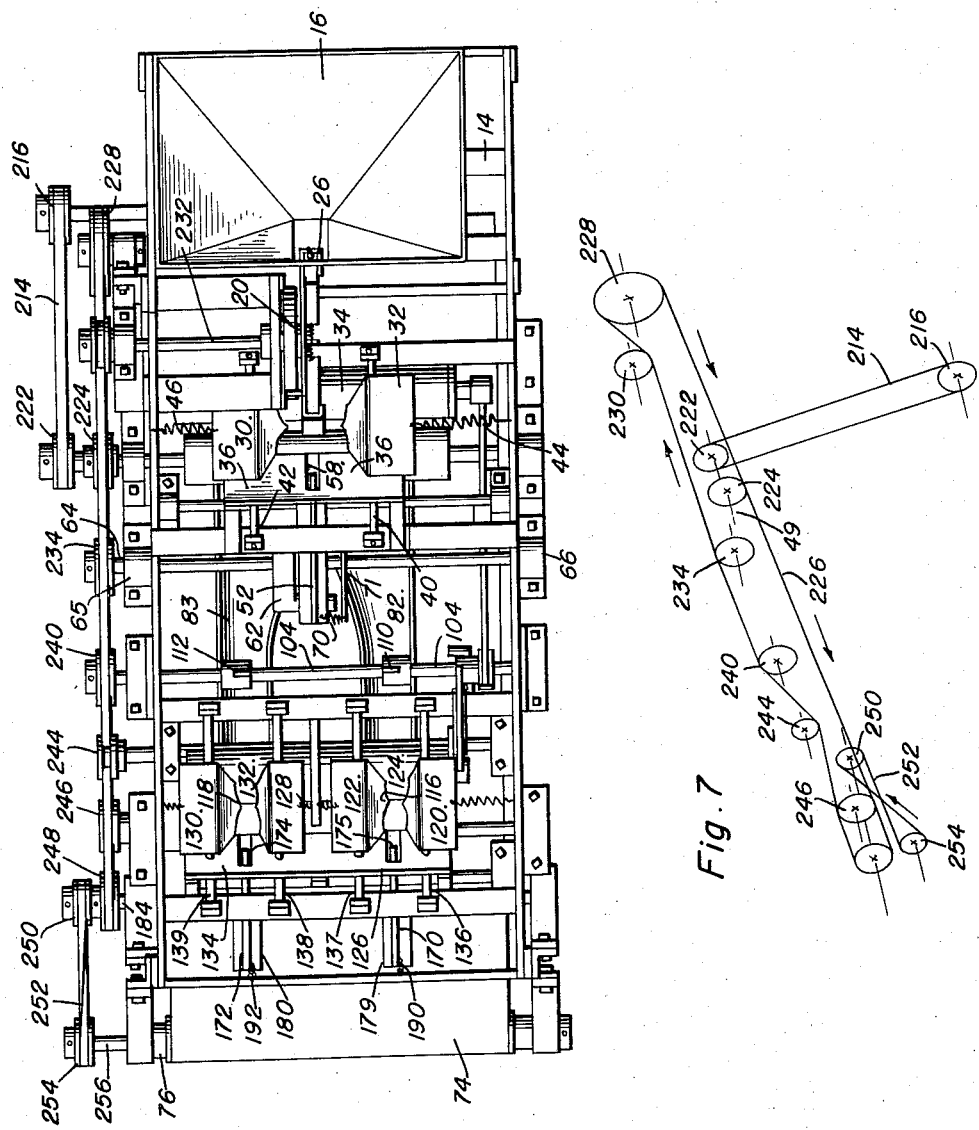
Figure 2 is a top plan view of the machine in Figure 1.

The means for displacing roller 50 are seen best in Figure 1 and comprise a push rod 92 having one end rotatably connected with shaft 93 on which roller 50 is mounted and having a bumper plate 94 on the other end thereof. Roller 50 is set in motion by being in contact with roller 48, the latter being drivingly connected as shown in Figure 7 and as will be described subsequently. Therefore there is no drive adjustment to impair a swinging motion for the roller 50 in order to open the bottom of pocket 28. This swinging motion is obtained by having the shaft 93 of roller 50 journaled in an arm 96 that is mounted for oscillation on pivot 98, the latter being carried by parts of support 12. There is a guide 100 bolted or otherwise fixed to a longitudinal member of the support 12 and it has the intermediate part of rocker 92 passed through it. The bumper plate is contacted by crank arm 102 that is fixed on shaft 104, the latter being mounted for rotation in bearings 106 on support 12.

Pushers 110 and 112 respectively are fixed to the shaft 104 and they are arranged to sweep the interior of troughs 82 and 83 in order to propel the potato parts into the lower or second pocket 116 and also into the lower or severing pocket 118. Pockets 116 and 118 are formed by structures that are identical to the structure which forms the pocket 28. Pocket 116 has its side walls made of two spring loaded deflector plates 120 and 122 together with stationary deflector plates 124 and 126 which form the opposite walls. Pocket 118 has walls made by two spring loaded deflector plates 128 and 130, while the stationary walls 132 and 134 are the same as walls 126 and 124. In fact, walls 134 and 126 may be made of a single piece of sheet metal and the same holds true of the walls 132 and 124. The movable deflector plates are mounted on pivots 136, 137, 138 and 139 that are carried by cross members on the support 12.

The bottoms of the pockets 116 and 118 are formed by a pair of rollers 140 and 142 respectively, the roller 140 being mounted for rotation on shaft 144 that is carried by bearings on support 12. Roller 142 is mounted for rotation on shaft 150 that is carried by arm 152 oscillatable on spindle 154. The latter is secured to brackets which are connected with and form a part of support 12. Push rod 158 is mounted rotatably on the end of shaft 150 and has a curved end 159 that is contacted by the crank arm 160, the latter being fixed to shaft 104 and adapted to reciprocate the push rod 158 in response to rotary motion of shaft 104. When push rod 158 is reciprocated, its motion is constrained by guide 164 that is secured to the support 12. Movement of this push rod is imparted to oscillatory motion of the arm 152 thereby displacing roller 142 away from roller 140 and opening the bottom of the pocket to allow the severed pieces of the potatoes to drop from the pockets onto the endless conveyor 74.

Figure 3:
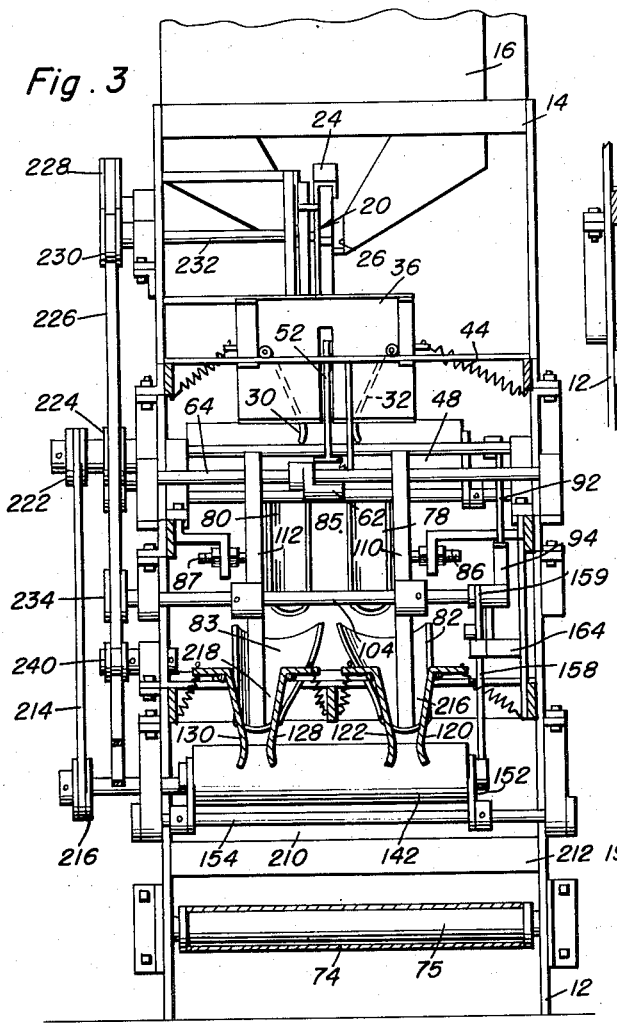
Figure 3 is a transverse sectional view taken on the line 3—3 of Figure 1.

The severing of the potato parts in pockets 116 and 118 is accomplished by knives 170 and 172, these knives being of identical construction. Knives 170 and 172 are operable through slots 174 and 175 in the deflectors 134 and 126. Each knife is mounted for oscillation on a shaft 178 that extends across the support 12, and each knife has a flange 179 and 180 which are contacted by crank arms 182 on shaft 184. This last mentioned shaft is mounted for rotation in bearings that are bolted or otherwise connected with support 12 and derives its motive force by a drive connection common to all of the essential moving parts of the machine so that the machine is timed properly for all operations. As in the case of the knife 52, knives 170 and 172 are returned by springs 190 and 192. The operation of the knife 170 is seen best by comparing the appropriate part of Figure 1 with Figure 3, the latter illustrating the knife in the cutting position.

Attention is now invited to Figure 8 where there is a knife 200, the latter having a crank arm contacting flange 202 and three blades 204, 206 and 208, each with a double arcuated cutting edge to fit over the pair of rollers that form the bottom of any of the pockets described previously. It is appreciated that the knives may be made with one blade or a number of blades depending on how many pieces the potato is to be subdivided to.

Motor 210 is mounted on a platform 212 of support 12 and has a belt 214 driven by the motor pulley 216. Belt 214 is entrained around a main drive pulley 222 that is fixed to the outer end of shaft 49 to which the roller 48 of pocket 28 is fixed. Roller pulley 224 is fixed to shaft 49 and has belt 226 entrained around it. This belt extends over an idler pulley 228 that is mounted on a spindle that is in a bearing secured to frame 12 near the bin 16. This belt then extends under pulley 230 on the end of shaft 232, the latter being used to drive the extractor 20. Belt 226 extends over pulley 234 that is fixed to the extremity of shaft 64, this shaft being used to oscillate the knife 52. The belt is then entrained over pulley 240 which is fixed to the extremity of shaft 104 which operates the pushers 110 and 112 and the push rods 92 and 158 that oscillate the rollers 50 and 142 respectively. Thereafter the belt is entrained under and idler pulley 244 on a spindle. The pulley 246 on the end of shaft 144 for roller 140 is drivingly connected with the belt and, finally, the belt extends around pulley 248 that is on the shaft 184 that is used for oscillating the knives 170 and 172. Pulley 250 is fixed to the shaft 184 along with pulley 248, and there is a belt 252 entrained around the pulley 250. This belt 252 extends over a pulley 254 that is on the end of shaft 256, the latter having conveyor roller 76 on it.

In use of the machine all of the movements are timed to operate in proper sequence. This is achieved by dimensioning of the pulleys and by other engineering expedients. Extractor 20 takes potatoes one at a time from bin 16 and deposits them into first pocket 28. Then the potato is retained on the bottom of the pocket 28, which bottom is live by virtue of the rolling movement of the rollers 48 and 50. This coacting with the yielding deflector plates that form two sides of the pocket hold the potato centered and poised for the severing operation that is accomplished by oscillation of knife 52. Upon the completion of the severing of the potato, the machine is so timed that roller 50 will be displaced permitting the two parts of the potato to fall downwardly and into the troughs 78 and 80. Should either of the parts of the potato be sufficiently small to fit in the space 85 between troughs 78 and 80, it will do so and become deposited directly onto the endless conveyor 74 which spills into a container of one type or another. The parts of the potatoes that move through troughs 78 and 80 become deposited on troughs 82 and 83 and are propelled along by the pushers to enter the pockets 116 and 118. Upon entry the parts of the potatoes are held centered by means of the pivotal and spring loaded deflector plates of the pockets and by means of the rotary movement of the rollers. Then the knives 170 and 172 or multiple bladed knives as shown in Figure 8 or others, are oscillated severing the parts of the potatoes. After this severing operation is completed roller 142 is oscillated by push rod 158 to permit the severed parts of the potatoes to fall onto the endless conveyor 74 and be carried away.

Although preferred forms of the invention have been illustrated and described, it is understood that various changes may be made without departing from the invention. For example the drive has been described as being of a belt and pulley construction. Other drives may be substituted, such as chain drives or gear and shaft drives. Therefore all modifications that fall within the scope of the following claims may be resorted to.

What is claimed as new is as follows:

1. A potato cutting machine comprising a support, a potato bin carried by said support, an extractor on said support to withdraw potatoes from said bin, a pair of rollers on said support and on which a potato is deposited by said extractor, means driving one of said rollers, means carried by said support to cut the potato while it is on said rollers, and means operable after said cutting means have cut said potato for moving one of said rollers to allow the parts of the potato to fall therefrom.

2. A potato cutting machine comprising a support, a potato bin carried by said support, an extractor carried by said support to withdraw potatoes from said bin, a pair of rollers carried by said support and on which a potato is deposited by said extractor, means driving one of said rollers to center a potato on the rollers, means on said support to cut the potato while it is on said rollers, means operable after said cutting means has cut the potato for moving one of said rollers to allow the parts of the potato to fall therefrom due to the force of gravity, troughs carried by said support on which the parts of the potato are accepted, a second pair of rollers and second cutting means carried by said support, means carried by said support to move the potato parts from said troughs and onto said second pair of rollers, and means carried by said support to actuate said second cutting means to sever said potato parts while on said second rollers.

3. A potato cutting machine comprising a support, a potato bin carried by said support, an extractor carried by said support to withdraw potatoes from said bin, a pair of rollers mounted on said support and on which a potato is deposited by said extractor, means carried by said support to cut the potato while it is on said rollers, means operable after said cutting means have cut the potato for moving one of said rollers to allow the parts of the potato to fall therefrom, troughs carried by said support on which the parts of the potato are accepted, said troughs being spaced from each other to provide a space by which to grade the cut potatoes as to size, a second pair of rollers and second cutting means carried by said support, means on said support to move the potato parts from said troughs and onto said second pair of rollers, and means to actuate said second cutting means to sever said potato parts while on said second rollers and then displace one of said second rollers to permit the severed potato parts to fall from said rollers.

4. The potato cutting machine of claim 3 wherein there are means connected with said troughs to adjust the size of space between said troughs, and means on said support to accumulate the potato parts which fall through said space.

5. In a potato severing machine, a potato cutting station which includes a potato pocket having sides and a bottom, means movable into said pocket toward said bottom to sever a potato therein, means to open said bottom after the potato has been severed into parts, a pair of troughs in alignment with the bottom of said pocket and laterally spaced from the place at which the potato is cut so that potatoes which are smaller than a predetermined size fall into the space between said troughs while the larger parts of the potatoes are conducted by the troughs, means operatively connected with said troughs to adjust said troughs toward and away from each other in order to alter said space between said troughs, a pair of second pockets, means arranged to deliver the cut pieces of potatoes from said troughs to said second pockets, a knife arranged to move toward the bottom of each pocket and again cut the potato so that said pieces are severed and subdivided, said second pockets each having a bottom composed of a pair of rollers, means to rotate said rollers so as to center the potato pieces for severing, and means to displace one of said rollers operatively connected therewith after said potato pieces have been subdivided.

6. The machine of claim 5 wherein the sides of at least one of said pockets are movable toward each other, and yielding means constantly pressing said sides toward each other in order to center the potato in its pocket.

7. In a seed potato cutting machine, the combination of a support, a potato cutting station which includes a potato pocket having sides and a bottom, adjustable means mounting said sides on said support so that the dimension of said pocket may be varied, said sides being pivotally mounted so that they are capable of deflecting, resilient means opposing the deflection of said sides in one direction, the bottom of said pocket composed of a pair of spaced rollers, means for rotating at least one of said rollers to center the potato therebetween, a cutter pivoted to said support and constrained to move into said pocket toward said rollers so as to sever the potato in said pocket while it is centered on said rollers, a pair of troughs carried by said support and located below said roller pocket, said troughs being spaced from each other to provide a passage therebetween, and means connected with one of said rollers and operatively connected with said cutter for displacing one of said rollers in timed sequence with the pivotal movement of said cutter in order to empty said pocket after the potato in said pocket has been severed so that pieces of the potato below a predetermined size are gravity lowered through said passage while pieces of the potato above said size are conducted by said troughs.

8. In a seed potato cutting machine, the combination of a support, a potato cutting station which includes a potato pocket having sides and a bottom, adjustable means mounting said sides on said support so that the dimension of said pocket may be varied, said sides being pivotally mounted so that they are capable of deflecting, resilient means opposing the deflection of said sides in one direction, the bottom of said pocket composed of a pair of spaced rollers, means for rotating at least one of said rollers to center the potato therebetween, a cutter pivoted to said support and constrained to move into said pocket toward said rollers so as to sever the potato in said pocket while it is centered on said rollers, a pair of troughs carried by said support and located below said roller pocket, said throughs being spaced from each other to provide a passage therebetween, and means connected with one of said rollers and operatively connected with said cutter for displacing one of said rollers in timed sequence with the pivotal movement of said cutter in order to empty said pocket after the potato in said pocket has been severed so that pieces of the potato below a predetermined size are gravity lowered through said passage while pieces of the potato above said size are conducted by said troughs, additional troughs carried by said support and in registry with the first mentioned troughs to receive potatoes therefrom, additional cutting stations at the ends of said additional troughs and in which the parts of the potatoes are adapted to be further sub-divided, means operable in said additional cutting stations for further sub-dividing said potato parts.

9. In a seed potato cutting machine, the combination of a support, a potato cutting station which includes a potato pocket having sides and a bottom, adjustable means mounting said sides on said support so that the dimension of said pocket may be varied, said sides being pivotally mounted so that they are capable of deflecting, resilient means opposing the deflection of said sides in one direction, the bottom of said pocket composed of a pair of spaced rollers, means for rotating at least one of said rollers to center the potato therebetween, a cutter pivoted to said support and constrained to move into said pocket toward said rollers so as to sever the potato in said pocket while it is centered on said rollers, a pair of troughs carried by said support and located below said roller pocket, said troughs being spaced from each other to provide a passage therebetween, and means connected with one of said rollers and operatively connected with said cutter for displacing one of said rollers in timed sequence with the pivotal movement of said cutter in order to empty said pocket after the potato in said pocket has been severed so that pieces of the potato below a predetermined size are gravity lowered through said passage while pieces of the potato above said size are conducted by said troughs, additional troughs carried by said support and in registry with the first-mentioned troughs to receive potatoes therefrom, additional cutting stations at the ends of said additional troughs and in which the parts of the potatoes are adapted to be further sub-divided, means operable in said additional cutting stations for further sub-dividing said potato parts, said additional pockets having sides, means displaceably mounting said sides on said support so that the dimension of said additional pockets is variable, and mechanical means carried by said support for propelling said potato parts along said additional troughs and into said additional pockets.

10. The potato cutting machine of claim 9 wherein there is an endless conveyor located beneath said additional pockets and said passage and on which to accumulate the parts of the potatoes.

11. The potato cutting machine of claim 9 wherein said additional cutting stations have pockets with bottoms composed of a pair of rollers by which to center the potato parts in said pockets prior to the sub-dividing of the potato parts.

References Cited in the file of this patent

UNITED STATES PATENTS

| | | |
|---|---|---|
| 631,027 | McCann | Aug. 15, 1899 |
| 1,337,968 | Schroeder | Apr. 20, 1920 |
| 1,954,870 | French | Apr. 17, 1934 |
| 1,990,774 | Butler | Feb. 12, 1935 |
| 2,752,967 | Sylvain | July 3, 1956 |